Patented Mar. 10, 1953

2,631,134

UNITED STATES PATENT OFFICE 2,631,134

SILICA SOL PROCESS

Ralph K. Iler and Frederick J. Wolter, Wilmington, Del., assignors to E. I. du Pont de Nemours & Company, Wilmington, Del., a corporation of Delaware No Drawing. Application November 7, 1951, Serial No. 255,335

8 Claims. (Cl. 252—313)

This invention relates to the preparation of silica sols by processes in which the alkali in an alkali metal silicate solution is neutralized with a cation-exchanger in the hydrogen form while maintaining a pH above 8. The invention in one specific embodiment is more particularly directed to processes in which the cation-exchange is effected with an alkali metal concentration of less than 0.35 normal, at a temperature above 60° C., and over a period of time not less than about one-half hour, whereby stable silica sols made up of particles of relatively large particle size are produced.

This application is a continuation-in-part of our copending application Serial No. 128,243, filed November 18, 1949, now abandoned.

Silica sols have been made by neutralizing the alkali of an alkali metal silicate solution with a cation-exchanger. Bird Patent 2,244,325 shows such processes.

In the process of the Bird patent and in similar processes using the hydrogen form of a cation-exchanger, a solution of an alkali metal silicate is brought into contact with the cation-exchanger at a pH which is initially quite high. After the cation-exchange has been effected, the pH ends up at a low figure, usually in the range of pH 3 to 5 in commercial operations. In such processes alkali is ordinarily added after the exchange to stabilize the sols. Sols cannot be made by such processes which have an $SiO_2$ content above 3 or 4 per cent, as they leave the cation-exchanger, because they will gel in contact with the cation-exchanger at higher concentrations. Alkali can be added to the sols so made and then they can be concentrated. These sols are fairly stable at $SiO_2$ contents up to about 15 per cent.

Silica sols prepared by neutralization of an alkali metal silicate solution with a cation-exchanger can be markedly improved by causing a growth of the silica particles to form dense, uniform, discrete particles. This process is described in an application of Max F. Bechtold and Omar E. Snyder, Serial No. 65,536, filed December 15, 1948, now Patent No. 2,574,902. The processes of Bechtold and Snyder are characterized by heating of a portion of sol and thereafter adding at least five times as much silica as was originally present by the addition of further quantities of sol.

The present invention permits the direct production of sols of higher $SiO_2$ content than those which can be prepared by prior art processes using the hydrogen form of a cation-exchanger. By using a process of the invention an alkali metal silicate solution can be treated with a cation-exchanger in the hydrogen form to produce a silica sol directly which contains a much higher $SiO_2$ concentration than can be obtained by prior processes using the hydrogen form of a cation-exchange resin.

The present invention also permits the direct production of sols by the treatment of alkali metal silicates with cation-exchangers in the hydrogen form under such conditions of temperature, alkali metal ion normality, pH, and time as results in the direct formation of sols of the type shown in Bechtold and Snyder. These sols are composed of particles which are quite dense and which have a particle size from about 10 to 150 millimicrons. The sols can be concentrated to, say, 30 per cent $SiO_2$ and even at such concentrations are quite stable for extended periods of time.

Any soluble alkali metal silicate may be used. Sodium silicate will usually be described throughout the specification since this is the cheapest of the soluble silicates, but it will be understood that potassium silicate is equivalent. The silicate used may have any mol ratio of $SiO_2:Na_2O$ from 1:1, that is metasilicate, up to 4:1, or say more practically, 3.9:1.

According to the invention the alkali of an alkali metal silicate solution is neutralized with the hydrogen form of a cation-exchanger. Cation-exchangers in the hydrogen form suitable for neutralizing alkali metal silicates are described in the Bird Patent 2,244,325 and in the Hurd Patent 2,431,481.

Any insoluble cation-exchanger in the hydrogen form may be used in processes of the invention and there may be used, for instance, sulfonated carbonaceous exchangers, sulfonated or sulfited insoluble phenol-formaldehyde resins or acid-treated humic material, or other similar exchangers. Sulfonated coal, lignin, peat, or other insoluble sulfonated humic organic material may be used.

Even more preferable are the insoluble resins made from phenols, such as those made from phenol itself, diphenylol sulfone, catechol, or naturally occurring phenols, as found, for example, in quebracho, and an aldehyde, particularly formaldehyde, which are modified by the introduction of sulfonic groups either in the ring or on methylene groups.

Cation-exchangers which are stable in their hydrogen forms are available commercially under such trade names as "Amberlite," "Ionex," "Zeokarb," "Nalcite," "Ionac," etc.

It is, of course, preferred that the resins selected be comparatively stable at the temperature and alkalinity of the processes of the invention. While the unstable cation-exchangers may be used a few times, they cannot under practical conditions of operation be re-used continuously.

One of the suitable cation-exchange resins for use according to the present invention is an aromatic hydrocarbon polymer containing nuclear sulfonic acid groups which is designated "Dowex-50" and of the general type described D'Alelio 2,366,007 and which is fully described as to its characteristics, properties, and general mode of use in the Journal of the American Chemical Society for November 1947, volume 69, No. 11, beginning at page 2830.

The synthesis and structure of ion exchange resins is reviewed in "Annual Review of Physical Chemistry," volume 2, 1951, published by Annual Reviews, Inc., Stanford, California, and reference should be had particularly to the section by G. E. Boyd. An especially preferred class of cation-exchangers are the carboxylic type such as, for example, a crosslinked copolymer of styrene and maleic anhydride, and a crosslinked polymethacrylic acid or polyacrylic acid, the crosslinking being conducted, for instance, with divinyl benzene. In the publication cited G. E. Boyd, on page 316, describes a carboxylic type cation-exchanger prepared by polymerizing methacrylic acid with about ten per cent its weight of divinyl benzene using a peroxide catalyst. This general type of product is commercially available as "Amberlite IRC-50."

The exchanger is generally prepared in a granular form which is readily leached free of soluble acids or salts. If the exchanger is exhausted by use it may readily be converted to the acid form by washing with a solution of an acid such as hydrochloric, sulfuric, sulfamic, and carboxylic, such as formic. It will be obvious that the regeneration will be much more efficient when the regenerating acid is a stronger acid than the acid groups on the resin.

Now in the processes of the present invention a solution of an alkali metal silicate as above described is brought into contact with the acid form of a cation-exchanger. The alkali of the silicate solution is neutralized by the cation-exchanger, while maintaining a pH above 8. When it is said that the alkali metal silicate solution is "neutralized," it will be understood that by this it is meant that the alkali metal ion is exchanged and the pH is lowered to a figure below that of the original solution. An alkali metal silicate solution ordinarily will have a pH somewhat above 11.

Throughout the reaction of the alkali metal silicate solution with the hydrogen form a cation-exchanger the pH is maintained above 8 as has been noted. It is preferred that the pH throughout be maintained at a figure no higher than 10.5.

The extent of the neutralization, or of the removal of alkali metal ion from the alkali metal silicate solution, can most easily be expressed in terms of the $SiO_2:M_2O$ ratio in the sol produced. It has been noted earlier that the silicate solution used at the beginning has a ratio of $SiO_2:M_2O$ no higher than about 4:1. This is a molar ratio in the case of alkali metal silicates generally, and is also approximately a weight ratio in the case of sodium silicate.

Any $SiO_2:M_2O$ molar ratio between 10:1 and 150:1 can be attained. The extent of neutralization of the alkali in the alkali metal silicate solution can be varied within rather wide limits. Any $SiO_2:M_2O$ molar ratio above about 10:1 can be obtained. In preferred processes of the invention the $SiO_2:M_2O$ ratio will be maintained between about 10:1 and 150:1. It is more specifically preferred to maintain a ratio in a range from about 30:1 to 150:1.

In the expression of ratio as $SiO_2:M_2O$ the letter "M" is used as is customary to represent the alkali metal, such as sodium or potassium.

If higher ratios than 150:1 are maintained during the processes of the invention or are reached at the end of the process, it will be found desirable to have a minimum of impurities in the system if a sol of any stability is to be produced. Impurities such as sulfate, chloride, and the like should either be excluded by the use of chemicals which are comparatively free of these materials, or they should be removed.

While operating a process of the invention and while maintaining the pH between 8 and 10.5, it is important that the alkali metal ion concentration be kept at less than 0.35 normal and preferably less than 0.2 normal. The alkali metal ion concentration can be kept to a low figure by increasing the amount of cation-exchanger or by using a comparatively smaller amount of alkali metal silicate solution compared to the volume of the aqueous system to which it is added. In other words, the alkali metal silicate should not be brought into contact with the cation-exchanger at so great a rate that the concentration of alkali metal ion rises above the figure indicated. The cation-exchanger should be allowed to keep up with the addition.

The total amount of water which is in contact with the cation-exchanger should be sufficient to permit good contact between the exchanger and the alkali metal silicate. Thus, the aqueous system together with the resin should not be so thick as to prevent good agitation and effective mixing of all parts of the system. To this end, the silica content of the sol should also be limited. If too much silica is present in the aqueous phase, some gelling or aggregation will occur. The resin may even become coated with silica.

The upper limit of $SiO_2$ concentration will vary with the particle size of the $SiO_2$ in the sol. With very small particles, the $SiO_2$ concentration may not exceed, say about 7 per cent. On the contrary, for very large particles which are near the upper limit of the colloidal range, the $SiO_2$ content may be much higher, and may be as high, for example, as 40 per cent. If the sols are free of impurities they can be more concentrated.

The tendency of the sol to gel depends upon, among other factors, the total surface area of the silica particles present in a given volume of solution. Thus, under the conditions of this process, it is preferred that the total surface of the silica particles in one liter of the sol not exceed about 75,000 square meters. Thus, for 5 millimicron particles, a silica concentration of about 12-13 grams of $SiO_2$ per 100 milliliters is about the upper practical operating limit, since silica particles having an average diameter of about 5 millimicrons have a specific surface area of the order of 600 m.$^2$/g. For particles having an average diameter of 10 millimicrons, this corresponds to an upper operating limit of about 25 grams of $SiO_2$ per 100 milliliters of solution.

It will be evident that in processes such as some of those hereinafter described in which the particles are caused to become larger during the course of the process, the concentration may be increased during the latter stages as the particle size increases.

Processes of the invention can be conducted in very dilute solutions such as 1 per cent $SiO_2$, but there is little advantage. The sols produced by contact with the cation-exchanger will preferably have an $SiO_2$ content of 3 per cent or more and, in general, since it is desired to make concentrated sols, the $SiO_2$ content will be as high as is feasible. For example, and as will be shown hereinafter in the illustrative examples, typical sols will contain, say, 10 per cent $SiO_2$ or even much more.

The temperature at which processes of the invention are conducted may vary from room temperature to considerably elevated temperatures. It is, however, preferred to use a temperature above about 60° C., especially when sols of maximum concentration or sols containing larger particles and having greatest stability are to be produced. Again, it is greatly preferred to use a temperature in excess of about 90° C., as will be hereinafter discussed in connection with a further specific embodiment of the invention.

The time during which the neutralization is effected and the process conditions are maintained can be widely varied depending upon the type of product desired. As will be observed hereinafter, a comparatively long period of time is required to produce products of greatest stability and largest particle size. Products of a very useful kind, however, may be made by conducting the process over as short a time as even a few minutes. If the process conditions above outlined are carefully met, then the addition can be effected as rapidly as is practical. Generally the time will be ten or fifteen minutes, or even longer. For the production of sols having a particle size greater than about ten millimicrons a longer time should be used, as will be hereinafter set forth.

The manner of effecting contact between an alkali metal silicate and a cation-exchanger is not at all like that heretofore used in which the solution is passed slowly through a bed of the cation-exchanger. In such a prior process the pH and the ratio in the solution varies from point to point in the bed of ion exchanger.

In processes of the invention the alkali metal silicate solution should be brought into intimate contact with all of the cation-exchanger to maintain a uniform and homogeneous condition throughout the system as to pH and ratio. While this can be effected by passing an alkali metal silicate solution very rapidly through a bed of exchanger and then continuously re-cycling the liquid, it is preferred to use a simpler method in which the cation-exchanger and alkali metal silicate solution are agitated together in any suitable manner, the resin thus ordinarily being in the form of a suspension or slurry.

A preferred method of effecting contact between the alkali metal silicate solution and the hydrogen form of a cation-exchanger is to add the cation-exchanger and alkali metal silicate solution simultaneously or alternately to a mixing zone. For example, the two components may both be added to a pipe or trough provided with means for agitation.

Again the two solutions may be run into a comparatively small receptacle in which a body of the mixture is maintained while being agitated, and then the mixture may be continuously withdrawn from the mixing zone.

It will also be apparent that the two reactants can be added to a larger body of liquid and permitted to accumulate until a batch of the desired size is reached. Again, a comparatively large body of a suspension resulting from a previous reaction of silicate and cation-exchanger can be withdrawn through a pipe and re-cycled and the two reactants added to this stream, which is then discharged into the main body of liquid.

Alternatively the hydrogen form of a hydrogen exchange resin may be suspended in water and a sodium silicate or an alkali metal silicate solution may then be added at such a rate as to maintain a pH within the range as already described. This is particularly effective where the cation-exchanger withdraws sodium ion from the solution sufficiently slowly that pH control is no great problem. This is especially the case with the weakly acidic cation-exchangers such as the carboxylic ion exchange resins. During the process further quantities of resin may be added to the aqueous system as needed.

Another method of operation is to start with a dilute solution of sodium silicate and to add thereto a cation-exchanger in hydrogen form. Again the rate will be such as to maintain the pH at the desired figure. Further quantities of silicate can be added. It should be noted that in this case the starting sodium silicate solution should be of such dilution that the sodium ion concentration does not exceed 0.35 normal after the $SiO_2:Na_2O$ ratio reaches about 10:1.

In other words, the sodium silicate solution thus used should preferably not contain more than about 10 per cent $SiO_2$ by weight.

It will be noted though, that it is not in general preferred to add the exchanger to sodium silicate. It is easier to maintain the conditions above described when the silicate is added to a slurry of the exchanger or when the exchanger is added simultaneously with the silicate.

It will be evident that there are numerous other ways commonly used for effecting complete contact of a solid material with a liquid, and that any of these may be used.

After the preparation of sols according to processes of the invention and under the conditions outlined has been completed, one may thereafter separate the exchanger from the sols produced. This may be done, for instance, by filtering, decanting, or centrifuging.

After the sols have been produced as described and after, or before, separation of the cation-exchanger the pH may be lowered by the addition of further quantities of the hydrogen form of a cation-exchanger. Or, if the cation-exchanger is not fully exhausted, the mixture may be stirred until the pH drops below 8 to whatever value is desired. The sols can even be stabilized temporarily on the acid side in accordance with known practices.

The sols produced according to processes of the invention may be used for a variety of purposes as have silica sols of the art. The sols produced which have particle sizes below about 10 millimicrons will be found valuable as nuclei in the preparation of stable sols according to processes such as those of Bechtold and Snyder described above. Sols of larger particles can be concentrated, as will be shown hereinafter. Sols produced according to the processes as described may be used for making gels or silica powders.

It will be noted that the limitation on sodium ion normality is to be observed only during the neutralization and preparation of sols by processes according to the invention. After the sol has been produced the sodium ion normality can be raised if it is desired to cause gelling or to form fine, precipitated silica products. This can be done by the addition of sodium silicate, sodium sulfate, or another sodium salt to a figure above 0.35 normal, and the silica will be precipitated from the solution in the form of a fine pulverulent product. The precipitation can also be facilitated by addition of water-miscible organic materials which lower the dielectric constant of the medium. Such water-miscible organic solvents as methyl, ethyl, propyl, or tertiary butyl alcohols, ketones such as methylethyl ketone, or acetone, acetamide, ethers of ethylene glycol, and the like may be used. To effect the precipitation, employing the solvents, the salt concentration need not be raised above 0.35 normal, for even at this figure or even somewhat below, precipitation of the silica can be effected. The pH during the precipitation should be above 6.

It will be understood that the foregoing description of process conditions is generally applicable to processes for producing sols having particles from a very small size up to the upper limit of colloidal dimensions. If it is specifically desired to prepare sols directly which have a particle size above about 10 millimicrons of the character of those shown in the Bechtold and Snyder application above cited, the process conditions now to be described may be used.

The pH during the process will be controlled as generally described above and will be held to a figure above pH 8, and preferably between 8 and 10.5. The alkali metal ion normality will be as previously described. The ratio similarly will be within a preferred range from about 60:1 to 150:1.

During the course of the neutralization as above described using the hydrogen form of a cation-exchanger to produce products having a particle size above about 10 millimicrons, the temperature of the system must be maintained above about 60° C., and it is greatly preferred to use a temperature in excess of 90° C. The neutralization may actually be effected at boiling temperatures or at temperatures in excess of boiling temperatures as obtained by increasing the pressure. As a practical matter the temperatures will usually not exceed about 100° C., and certainly will not exceed about 150° C. because of the difficulties of constructing suitable equipment and because of the effect upon cation-exchangers.

The period of time over which the neutralization is effected, i. e., the total time required for the addition of the resin to the silicate solution, under the conditions described is a function of the temperature. The time of neutralization must be at least $$\left(2^{\frac{95-T}{10}} \times 45\right)$$

minutes, T being the temperature in degrees C. These times represent minimums, and the minimum time for neutralizing at representative temperatures will be seen from the following tabulation:

| Temperatures, °C.: | Time, minutes |
|---|---|
| 115 | 11.2 |
| 105 | 22.5 |
| 95 | 45 |
| 85 | 90 |
| 75 | 180 |

The time thus referred to is applicable to the case where the hydrogen form of the cation-exchanger is added at a uniform rate to a solution of an alkali metal silicate containing, for instance, 6 per cent $SiO_2$. The time of neutralization is measured from the point in the neutralization where the $SiO_2:M_2O$ mol ratio is 6:1 until the desired end-point, where essentially all of the alkali metal ion has been removed, is reached. The time can be much longer and may continue for a period of hours without difficulty. The preferred times for practical operation will ordinarily be 2 or 3 times as long as the stated minimums. Also, it will be observed that while the minimum time is strictly that required after the $SiO_2:M_2O$ ratio rises above 6:1, as a practical matter the total time will be used. There is no practical necessity for determining the mol ratio in commercial operation and the neutralization will be effected at a rather regular rate over a period at least equal to the minimums given and preferably somewhat over the minimums.

In carrying out a process as just above described a solution of an alkali metal silicate is first prepared and to this is added the cation-exchanger in hydrogen form. The addition will be at a regular rate and, if desired, further quantities of silicate and resin can be added to the system to grow particles of still larger size.

The "build-up" of the particles in the sol may from this point on be carried out very much as in the Bechtold and Snyder application above mentioned except that the active silica is formed in situ by the neutralization of the alkali metal silicate with the hydrogen form of a cation-exchanger. The amount of build-up may be, as in Bechtold and Snyder, as much as 5:1, or even more, to obtain sols of great stability and particles of large size.

In order that the invention may be better understood the following examples are given in addition to those already described:

*Example 1*

In this example, the reaction is carried out by the simultaneous addition of silicate and resin to a reaction vessel while continuously withdrawing the silica sol thus formed.

The reaction is carried out in a four liter stainless steel beaker with an overflow pipe, which maintains the contents of the beaker at two liters; at the outset the beaker is filled with water. A solution of sodium silicate (3.25 $SiO_2:Na_2O$, 10 per cent $SiO_2$) is fed into the beaker at a rate of 25 ml./min. Simultaneously wet, drained "Amberlite IRC-50" (hydrogen form) is fed into the beaker at such a rate as to maintain the pH at 9±0.3. The temperature is maintained at about 60° C. The system is vigorously stirred during silicate addition. The overflow is dropped onto a filter and filtered immediately, the first two liters of filtrate being discarded. The addition of resin and silicate is continued for several hours.

The product is a silica sol having a pH of about 9, an $SiO_2:Na_2O$ ratio of about 100:1, and containing about ten per cent $SiO_2$.

*Example 2*

This is an example of the preparation of a silica sol containing about 8 per cent $SiO_2$ and having particles which are about 7 millimicrons in diameter. In this example, silica deposition on the resin is very low.

A slurry of 850 gm. of wet drained (50 per cent solids) "Amberlite IRC-50" resin in the hydrogen form, and 1000 ml. of water was heated to 80° C. To this slurry was added 1000 ml. (1196 gm.) of a sodium silicate solution (20 g. $SiO_2$:100 ml. and $SiO_2:Na_2O=3.25$) according to the following schedule.

| Time (Min.) | Ml. Silicate Added | T °C. |
|---|---|---|
| 0 | 0 | 80±2 |
| 1 | 125 | 80±2 |
| 5 | 400 | 80±2 |
| 10 | 600 | 80±2 |
| 15 | 750 | 80±2 |
| 20 | 900 | 80±2 |
| 25 | 1,000 | 80±2 |

This slurry was filtred, using a filter cloth on a Buchner and applying vacuum for about 15 seconds, yielding about 1400 g. of filtrate containing about 12 per cent $SiO_2$. The resin on the filter was washed with 800 ml. of water, the filtrate containing about 3 per cent $SiO_2$. The two filtrates were mixed. The $SiO_2:Na_2O$ ratio in this sol was about 100:1.

The pH of this mix was lowered to 7.0 by adding 175 g. of wet resin and stirring for about 15 minutes. The slurry was then filtered and the resin was washed with 100 ml. of water.

The product was a silica sol containing 8.2 per cent $SiO_2$ and having particles about 7 millimicrons in diameter, which corresponds to a dried silica having a surface area of 388 m.$^2$/g.

A sample of the resin used in this experiment was washed thoroughly with distilled water and dried at 125° C. The dried resin contained about 0.2 per cent $SiO_2$.

*Example 3*

This example is similar to Example 2, except that the reaction was carried out at 70° C., and the surface area of the silica in the final product was 452 m.$^2$/g.

*Example 4*

This example is similar to Example 2, except that the reaction was carried out at 90° C., and the silica in the final product had a surface area of 388 m.$^2$/g.

*Example 5*

This example is similar to Example 2, except that the rate of addition of the silicate was about 1½ times as fast as in Example 2, and the silica in the final product had a surface area of 441 m.$^2$/g.

*Example 6*

This example is similar to Example 2, except that 1000 grams of resin was used in the reaction, the pH of the sol was 8.0 prior to pH adjustment, and the silica in the sol had a surface area of 426 m.$^2$/g.

*Example 7*

This example illustrates the preparation of a silica sol by a process in which a sulfonic acid resin was fed simultaneously with a sodium silicate solution into a heel of water.

The reaction was carried out in a one liter beaker. During the reaction the slurry was vigorously stirred. Two hundred milliliters of water was added to the beaker and this was heated to a temperature of 90° C. Thereupon, simultaneously but separately, samples of resin and sodium silicate were added to the solution. The resin was "Nalcite HCR," in the hydrogen form, which was drained dry, the resin containing about 50 per cent solids when dried at a temperature of 125° C. About 28 grams of resin was added every four minutes. The sodium silicate solution was prepared by diluting 1410 grams of "F" grade sodium silicate (having an $SiO_2$ content of 28.4 per cent and an $SiO_2:Na_2O$ mol ratio of 3.25) to a total volume of two liters. This sodium silicate solution was fed into the reaction vessel at a rate of 10 milliliters per minute. During this process, the pH was held in the region of about 9.5 and the temperature in the range between 90 and 95° C. The additions were continued over a period of about 32 minutes, during which time 320 milliliters of sodium silicate solution were added. After the deionization, the slurry was filtered, the filtrate had a pH of 9.25. The filtrate was analyzed and found to contain 13.5 per cent $SiO_2$.

In order to determine the size of the silica particles in the sol, the silica was recovered from the solution by dropping the pH of the solution to 7 with ion exchange resin, warming the solution until it gelled, adding n-propanol to the gel and removing the water by azeotropic distillation. The dry silica powder thus obtained had a surface area of 301 m.$^2$/g.

A sample of the resin used in this preparation was analyzed in order to see how much silica had deposited on the resin during the process. It contained 0.24 per cent $SiO_2$, based on the dried resin.

*Example 8*

This is an example of the preparation of a silica sol containing very small silica particles by the addition of an ion exchange resin batchwise to a solution of sodium silicate.

The solution of sodium silicate containing 10 grams of $SiO_2$ per 100 ml., and having an $SiO_2/Na_2O$ mol ratio of 3.25, was heated to 50° C. To one liter of this solution there was added, with vigorous agitation, 25 grams of "Amberlite IRC-50" (wet, drained, regenerated resin in the hydrogen form, containing about 50 per cent solids when dried at 125° C.) every two minutes for a period of 15 minutes.

This mixture was filtered, the filtrate having a pH of 10.3. This solution was then cooled to about 15° C., and further deionized by the addition of fresh "Amberlite IRC-50" resin until the pH dropped to 6. This slurry was then filtered, the silica sol was allowed to stand until it gelled.

When the silica in this gel was recovered by removing the water by azeotropic distillation from n-propanol, the gel was found to have a surface area of 680 m.$^2$/g., corresponding to silica particles which are about 4 millimicrons in diameter.

*Example 9*

Five hundred ml. of a sodium silicate solution containing 10 grams of $SiO_2$ per 100 ml. was placed in a beaker with a stirrer and heated to 80° C. To this solution, 150 grams of "Amberlite IRC-50" resin in the wet, drained state (containing 50 per cent solids) was added. This solution was stirred vigorously, and after 1 minute, 250 ml. of a second solution of sodium silicate containing about 150 grams of $SiO_2$ per liter, was added at such a rate as to maintain a pH of about 10.5.

The slurry was filtered, the filtrate had a pH of 10.4, and contained about 10 per cent $SiO_2$.

*Example 10*

In this example "Amberlite IRC-50," a polycarboxylic resin in the hydrogen form was placed in a column. Water was circulated at high velocity (20 bed displacements per minute) through this column. To this water there was added a sodium silicate solution, containing 28 per cent $SiO_2$, and having an $SiO_2/Na_2O$ ratio of 3.25. In the experiment, 500 mls. of wet, drained resin was used, and 600 mls. of water. To this, 400 grams of sodium silicate were added over a period of 30 minutes. The temperature during the reaction was maintained between 30 and 40° C. The silica sol thus obtained was separated from the resin by draining. This silica sol had a pH of 10.0, and an analysis of about 12 per cent $SiO_2$.

Example 11

A solution of sodium silicate having an SiO$_2$:Na$_2$O weight ratio of 3.25 and an SiO$_2$ content of 4 per cent by weight was placed in a reaction vessel provided with means for agitation and heating. The solution was heated to 95° C. and "Dowex 50-G" was added in an acid form having been regenerated with sulfuric acid and being in a washed, wet, drained condition. The exchanger was slowly added to the solution of silicate over a period of two hours. The total amount of resin added was sufficient to lower the pH of the solution finally to about 9.5. During the period of addition and heating there was agitation of the system.

The result was a silica sol which was separated by decantation from the resin. The silica sol had an SiO$_2$ content slightly lower than the original silicate because of the water introduced on the resin. The sol was concentrated to 15 per cent SiO$_2$ by weight by the direct evaporation of water. The sol is stable over a period of months of standing at normal temperatures and is suitable for treatment of textiles, inclusion in waxes, and so forth.

Example 12

A sol prepared as in Example 11 and containing about 4 per cent SiO$_2$ was placed in a vessel and heated to 95° C. A resin of the type used in Example 11 was slowly added simultaneously with a sodium silicate solution such as that of Example 11, excepting that it contained 12 per cent SiO$_2$ by weight. The proportions of the resin and silicate were such as to maintain a pH in the neighborhood of 9 to 10. The solution was, of course, agitated at all times and the rate of addition of the two materials was such that one part by weight of silica in the incoming solution was added for one part of the original silica in the starting solution per hour. This was continued for a period of six hours so that 6 parts of silica in the form of sodium silicate solution was added for each part of silica present in the original sol.

During the run the solution increased in concentration and in turbidity and the particle size of the fine particles in the sol was increased. The final sol had an SiO$_2$ content by weight of about 11 per cent. The final pH of the sol as measured at 30° C. on a cool portion, in the absence of resin, was 8.5, this value being obtained by minor adjustments of resin and sodium silicate solution at the end.

The sol was separated from resin, heated for a period of a half an hour at 95° C., and then concentrated by direct evaporation to a concentration of 30 per cent SiO$_2$.

We claim:

1. In a process for the production of a silica sol, the steps comprising neutralizing the alkali in an alkali metal silicate solution with a cation-exchanger in the hydrogen form while maintaining a pH above 8.

2. In a process for the production of a silica sol, the steps comprising neutralizing the alkali in an alkali metal silicate solution with a cation-exchanger in the hydrogen form while maintaining a pH above 8, and an alkali metal ion concentration of less than 0.35 normal.

3. In a process for the production of a silica sol, the steps comprising adding an alkali metal silicate solution to a mixing zone, maintaining a pH in said zone between 8 and 10.5 and an alkali metal ion concentration of less than 0.35 normal, and withdrawing the resulting sol from the mixing zone.

4. In a process for the production of a silica sol, the steps comprising adding an alkali metal silicate solution and a cation-exchanger in the hydrogen form to a mixing zone wherein the pH is maintained between 8 and 10.5, and continuously withdrawing the resulting sol from said zone.

5. In a process for the production of a silica sol, the steps comprising neutralizing the alkali in an alkali metal silicate solution by bringing said silicate and a cation-exchanger together while maintaining a pH between 8 and 10.5, and an alkali metal ion concentration of less than 0.35 normal, the neutralization being effected at a temperature between 60° C. and 150° C. and over a period of time of at least $$\left(2^{\frac{95-T}{10}} \times 45\right)$$

minutes, T being the temperature in degrees C.

6. In a process for the production of a silica sol, the steps comprising adding sodium silicate solution having an SiO$_2$:Na$_2$O ratio below 4:1 to a cation-exchanger to raise the ratio to between 10:1 and 150:1, while the change in ratio is being effected maintaining a pH above 8, a sodium ion concentration of less than 0.35 normal, and a temperature above 60° C., the time of raising the ratio being $$\left(2^{\frac{95-T}{10}} \times 45\right)$$

minutes, T being the temperature in degrees C.

7. In a process for the production of a silica sol, the steps comprising adding a sodium silicate solution having an SiO$_2$:Na$_2$O ratio below 4:1 and a cation-exchanger in the hydrogen form to a mixing zone while agitating and while maintaining a pH between 8 and 10.5, a sodium ion concentration of less than 0.35 normal and a temperature from 60 to 100° C., and continuously withdrawing the resulting sol and the cation-exchanger from the mixing zone.

8. In a process for the production of a silica sol, the steps comprising neutralizing the alkali in an alkali metal silicate solution to an SiO$_2$:M$_2$O ratio from 10:1 to 150:1 by bringing said silicate and a cation-exchanger together while maintaining a pH above 8 and an alkali metal ion concentration of less than 0.35 normal, the neutralization being effected at a temperature between 60 and 150° C. and over a period of time of at least $$\left(2^{\frac{95-T}{10}} \times 45\right)$$

minutes, T being the temperature in degrees C.

RALPH K. ILER.
FREDERICK J. WOLTER.

REFERENCES CITED

The following references are of record in the file of this patent:

UNITED STATES PATENTS

| Number | Name | Date |
|---|---|---|
| 2,244,325 | Bird | June 3, 1941 |
| 2,457,971 | Voorhees | Jan. 4, 1949 |